United States Patent
Nádas et al.

(10) Patent No.: US 10,389,690 B2
(45) Date of Patent: Aug. 20, 2019

(54) METHOD AND SYSTEM FOR MANAGING COMMUNICATIONS IN A SYSTEM COMPRISING A RECEIVER ENTITY, A SENDER ENTITY, AND A NETWORK ENTITY

(71) Applicant: Telefonaktiebolaget LM Ericsson (publ), Stockholm (SE)

(72) Inventors: Szilveszter Nádas, Budapest (HU); Attila Mihály, Dunakeszi (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

(21) Appl. No.: 15/564,749

(22) PCT Filed: Apr. 28, 2015

(86) PCT No.: PCT/EP2015/059252
§ 371 (c)(1),
(2) Date: Oct. 6, 2017

(87) PCT Pub. No.: WO2016/173635
PCT Pub. Date: Nov. 3, 2016

(65) Prior Publication Data
US 2018/0109503 A1    Apr. 19, 2018

(51) Int. Cl.
*H04L 29/06* (2006.01)
*H04L 12/801* (2013.01)
*H04L 29/08* (2006.01)

(52) U.S. Cl.
CPC .......... *H04L 63/0457* (2013.01); *H04L 47/35* (2013.01); *H04L 63/0428* (2013.01);
(Continued)

(58) Field of Classification Search
CPC .... H04L 47/35; H04L 63/0428; H04L 63/061
See application file for complete search history.

(56) References Cited

U.S. PATENT DOCUMENTS

| | | | |
|---|---|---|---|
| 2004/0006602 A1* | 1/2004 | Bess | H04L 29/06 709/207 |
| 2005/0081048 A1* | 4/2005 | Komarla | G06F 3/0623 713/193 |

(Continued)

FOREIGN PATENT DOCUMENTS

WO   2008015379 A1   2/2008

OTHER PUBLICATIONS

Hofstede et al., "Flow Monitoring Explained: From Packet Capture to Data Analysis With NetF", IEEE Communications Surveys & Tutorials ( vol. 16 , Issue: 4 , Fourthquarter 2014) (Year: 2014).*

(Continued)

*Primary Examiner* — Morshed Mehedi
(74) *Attorney, Agent, or Firm* — Sage Patent Group

(57) ABSTRACT

It is provided a system comprising a sender entity, a receiver entity, and a network entity interposed between the sender entity and the receiver entity. The receiver entity is configured to send a connection request to the sender entity, and to further send to the sender entity at least one encrypted meta-information for said connection. The sender entity is configured to insert the at least one encrypted meta-information into at least one packet of the connection. The network entity is configured to decrypt the at least one meta-information and to process the at least one packet on the basis of the decrypted at least one meta-information.

19 Claims, 11 Drawing Sheets

(52) U.S. Cl.
CPC ............ *H04L 63/061* (2013.01); *H04L 67/28* (2013.01); *H04L 67/322* (2013.01); *H04L 69/22* (2013.01)

(56) References Cited

U.S. PATENT DOCUMENTS

| | | | |
|---|---|---|---|
| 2007/0081673 A1* | 4/2007 | Ren | H04L 9/0637 380/270 |
| 2010/0135287 A1 | 6/2010 | Hosain et al. | |
| 2012/0008498 A1* | 1/2012 | Clemm | H04L 41/0213 370/235 |
| 2014/0173275 A1* | 6/2014 | Johnson | H04L 9/00 713/161 |
| 2015/0341285 A1* | 11/2015 | Aysola | H04L 63/0428 370/392 |
| 2016/0119289 A1* | 4/2016 | Jain | H04L 63/0281 726/12 |

OTHER PUBLICATIONS

Ericsson, "Mobility Report on the Pulse of the Networked Society", Jun. 2014, pp. 1-32.

* cited by examiner

METHOD AND SYSTEM FOR MANAGING COMMUNICATIONS IN A SYSTEM COMPRISING A RECEIVER ENTITY, A SENDER ENTITY, AND A NETWORK ENTITY

TECHNICAL FIELD

The present invention relates in general to managing communications in a system, more specifically to managing communications in a system comprising a sender entity, a receiver entity, and a network entity. More in detail, the present invention relates to a system, a method for managing communications, a sender entity, a receiver entity, a network entity, a program and a signal.

BACKGROUND

There are currently a few trends in networking. One relates to the privacy of communication. Accelerated by the recent pervasive monitoring attempts revealed, more and more traffic is sent end-to-end encrypted. One relevant example is the recently finalized HTTP2.0 protocol (second major version of the Hypertext Transfer Protocol) in IETF (Internet Engineering Task Force), which assumes de facto encryption using TLS (Transport Layer Security) over TCP (Transmission Control Protocol). Similarly, the recently proposed next-generation transport protocol for web by Google, QUIC (Quick UDP Internet Connections), also assumes end-to-end encryption.

Another change relates to the multiplexing of traffic. In the case of best-effort handling at the bottleneck, traffic multiplexing between the same endpoints allows for resource sharing that is more aligned with the QoE-needs (QoE stands for Quality of Experience) of the different streams sharing the same connection. This is why HTTP2.0 also uses the multiplexing paradigm. Similarly, QUIC is also based on the multiplexing paradigm. Another example is WebRTC which multiplexes audio, video streams and potential file transfers onto the same UDP connection. WebRTC is a free, open project that provides browsers and mobile applications with Real-Time Communications (RTC) capabilities via simple APIs.

A typical network architecture comprises the presence of network entities, of which later described middleboxes are an example, which are interposed between the nodes. Middleboxes are used for a number of reasons, including implementing acceptable use policies, maintaining regulatory compliance, thwarting attacks, censoring or monitoring users, expanding address space, limiting or balancing resources.

In an all-encrypted, multiplexed world some communication to network middleboxes will still be needed. Middleboxes could have different roles. For example, they may act as Policy Decision Points: they may select domain specific QoS (Quality of Service) solution of flows/packets based on traffic identification, flow states and/or packet handling information. Traditionally in case of broadband traffic DPI/SPI (Deep Packet Inspection/Shallow Packet Inspection) boxes perform this role, but DPI/SPI (Deep Packet Inspection/Shallow Packet Inspection) methods are hardly applicable for encrypted and multiplexed traffic. Signaling based solutions have not gained acceptance due to deployment complexity. They may provide information about the network path, e.g. maximum achievable bitrate, minimum delay, etc. to aid path selection, i.e. to help end-point decide which access to use. They may send advisory messages to applications to help adaptation. Examples for such advisory messages are to provide an initial congestion window or advise up/down-stepping the QoE level in case of adaptive media, based on the congestion status of the network. They may provide transport protocol enhancement in several layers. They may optimize FEC (Forward Error Correction) and retransmission. In general, middleboxes may apply specific treatments to the packets when forwarding those packets to the network nodes, noting that packet treatment includes, but is not limited to, any notorious packet treatment as described for instance in RFC 2474, RFC4221, RFC2598, RFC3260.

All the above roles and functions require some kind of meta-information exchange between the end-points and middleboxes, mostly about traffic characteristics information. Such meta-information refers to information that enables the middlebox to apply a specific treatment to the packet, as also later explained in more detail.

The present invention relates to meta-information reveal by the traffic sender using for instance the same connection, i.e., in-band meta-information reveal by sender. This is a feasible and advantageous, and sometimes unique alternative to other signaling methods. For example, in case of traffic multiplexing, the information revealed may change from packet to packet in a connection. For example, if the endpoints request different traffic treatment for the voice traffic, video traffic and data traffic for a WebRTC connection, then it should be possible for the middlebox to identify the packets belonging to the different streams. This requires some kind of additional packet markings to the middlebox, because the set of five different values that comprise a Transmission Control Protocol/Internet Protocol (TCP/IP) connection (5-tuple) is the same for all the packets.

In some cases, even for a single stream per connection the information to reveal may change from packet to packet, which would require frequent signaling updates if not solved by meta-information including for instance some type of packet markings. In the case of SVC (Scalable Video Coding) videos, for example, the QoS treatment desired may differ depending on which QoS layer a given packet carries.

Another advantage of in-band meta-information reveal is that is always on-path, i.e., the information is attached to the traffic. That is, no problems may arise e.g., due to re-routing (due to e.g., hand-avers) or multi-path delivery.

There are existing methods for in-band meta-information reveal, e.g., by marking the DiffServ Codepoints (DSCP, RFC4594) in the IP packet headers (DiffServ or differentiated services is a computer networking architecture that specifies a simple, scalable and coarse-grained mechanism for classifying and managing network traffic and providing QoS on modern IP networks). However, DiffServ markings are un-encrypted and their usage has been limited to a single-domain, because of the fact that these fields may be easily modified across network domains.

There are different methods to send end-to-end encrypted data between two endpoints. With reference to FIG. 7, the commonly accepted methods use three different pieces of information for encoding: the information to encode 710 (showed as "plain text" in the figure); the encryption key(s) 730; an initialization vector 720 (IV). By means of an encoding algorithm 700, the encoded or cyphered information 740 is obtained.

An initialization vector is a nonce used for data encryption. In this context, "nonce" stands for "number used once" or "number once". The initialization vector, used only once in any session or connection, prevents repetition of sequences in encrypted text. Identifying such repetitions can help an attacker break a cipher. The initialization vectors or related algorithms and random numbers may be exchanged between the parties during security context setup, but there are algorithms for which the nonce must be unique, but predictability of the initialization vector is acceptable, and may therefore be a simple counter e.g., some unique packet sequence numbers may be used as initialization vector.

The decryption of the encrypted end-to-end data is then the opposite process using some keys and the same initialization vector, shown in FIG. 8. Accordingly, the encoded or cyphered text 710, the IV 820 and the key(s) 830 are used for the decoding (or deciphering) algorithm 800 in order to obtain the deciphered information 840 corresponding to the information 740 of FIG. 7.

It further becomes desirable applying encryption to the meta-information, as this enhances security. For instance, such encryption reduces the risk that the treatment of packets is altered by network nodes that, by getting knowledge of the meta-information, may apply them differently and/or to other packets such that the packets forwarding may not anymore be as intended or desired. Within this context, it has been found that merely encrypting the meta-information at the sender may not be free from problems. It thus becomes necessary finding a suitable way for safely handling meta-information, and to avoid prior art problems related to the handling of meta-information. It is thus an object to provide an improved handling of meta-information.

SUMMARY

The object is achieved by the subject-matter of the independent claims. Advantageous embodiments are defined in the dependent claims. Further examples are provided for facilitating the understanding of the invention.

According to a first aspect of the invention, it is provided a system comprising a sender entity, a receiver entity, and a network entity interposed between the sender entity and the receiver entity, wherein: the receiver entity is configured to send a connection request to the sender entity, and to further send to the sender entity at least one encrypted meta-information for said connection; the sender entity is configured to insert the at least one encrypted meta-information into at least one packet of said connection; the network entity is configured to decrypt the at least one meta-information and to process the at least one packet on the basis of the decrypted at least one meta-information.

According to a second aspect of the invention, it is provided a method for managing communications in a system comprising a sender entity, a receiver entity, and a network entity interposed between the sender entity and the receiver entity, the method comprising the steps of: causing sending, from the receiver entity to the sender entity, of a connection request and of at least one encrypted meta-information for said connection; causing, at the sender entity, inserting the at least one encrypted meta-information into at least one packet of said connection; causing, at the network entity, decrypting the at least one meta-information and causing processing of the at least one packet on the basis of the decrypted at least one meta-information.

According to a third aspect of the invention, it is provided a receiver entity in a system comprising a sender entity, said receiver entity, and a network entity interposed between the sender entity and the receiver entity, said receiver entity comprising: sending means configured to send a connection request to the sender entity, and to further send to the sender entity at least one encrypted meta-information for said connection, wherein the meta-information is decryptable by the network entity, and wherein the sender entity is capable of handling the meta-information only in encrypted form.

According to a fourth aspect of the invention, it is provided a sender entity in a system comprising said sender entity, a receiver entity, and a network entity, said sender entity comprising: inserting means configured to insert at least one encrypted meta-information received from the receiver entity into at least one packet of said connection, wherein the sender entity is capable of handling the meta-information only in encrypted form.

According to a fifth aspect of the invention, it is provided network entity in a system comprising a sender entity, a receiver entity, and said network entity interposed between the sender entity and the receiver entity, said network entity comprising: decrypting means configured to decrypt at least one meta-information included in a packet of a connection established between the sender entity and the receiver entity; processing means configured to process the at least one packet on the basis of the decrypted at least one meta-information.

According to a sixth aspect of the invention, it is provided a program for managing communications in a system comprising a sender entity, a receiver entity, and a network entity, the program configured to execute, when said program is executed on a computer, all the steps according to the method according to the second aspect.

According to a seventh aspect of the invention, it is provided a signal suitable for carrying a packet of a connection established between a sender entity and a receiver entity, the packet including an encrypted meta-information encrypted by the receiver entity and decryptable by a network entity.

DETAILED DESCRIPTION

Figure 1:
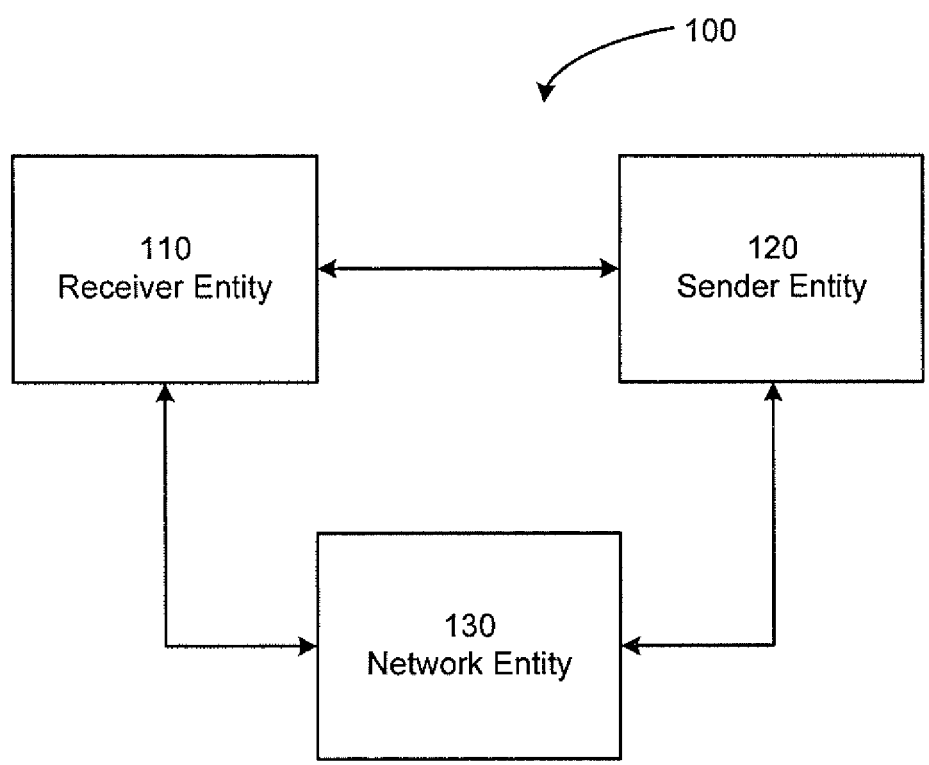
FIG. 1 illustrates a system according to a first embodiment of the present invention.

In relation to the encryption of meta-information, there are some important recognitions and observations to note. Firstly, in many cases the meta-information should also be encrypted in order not to reveal it to non-authorized party. For example, a request for a specific domain treatment would reveal the QoS structure used by the ISPs in their networks and could motivate others try to get a specific service they are not entitled to, and by this imposing a big demand on the operator policy for filtering out such attempts.

One solution could lie in encrypting at the sender side: the encryption may use some non-repetitive information from the packet header as nonce, e.g., a sequence number. This may however lead to problems in that the sender may wrongly associate an encrypted meta-information to a packet for which the meta-information was not intended. Thus, to obviate such issue, the encryption may be done at the receiver. However, if the receiver is to send the meta-information to the middlebox through the sender then the receiver does not know about the structure of the packet, so it cannot make use of this information when encrypting the meta-information. Using pre-agreed nonces between the receiver and middlebox for encryption is regarded as sub-optimal solution because of the large number of potential connections.

Secondly, the meta-information should use a different encryption from the encryption of the end-to-end communication, since the information is targeting a different entity (the middlebox) so it should be decryptable by the middlebox. Most advantageous is to use a common key for encryption of meta-information by which both the middlebox and the receiver will be able to decrypt (and/or encrypt) the meta-information. The latter is beneficial in order to provide a means to the receiver to verify if the correct meta-information was transferred (it may break the connection if that is not fulfilled).

However, also when encrypting at the receiver, there could be a problem in that an encrypted meta-information may be inserted into a packet for which that meta-information was not intended or desired. In other words, there is a problem in that the packets may not be forwarded according to the intended meta-information. As explained below, it is suggested to encrypt the meta-information at the receiver, however the encryption of the meta-information is made for a specific connection established between the sender and the receiver. The middlebox (but not the sender) is capable of decrypting the meta-information. The sender is requested to insert the encrypted meta-information (received from the receiver) into the packet, handling it in encrypted form. In case the sender would wrongly insert the encrypted meta-information into a packet for a different connection (e.g. a connection of another receiver or another connection of the same receiver), the middlebox would not be able to decrypt the meta-information, or would be able to detect that there was a problem at the sender side. In this case, for instance: the middlebox may discard the packet and the receiver may request the packet again; the middlebox may notify the receiver about the detection of a problem at the sender so that the receiver may act accordingly, for example it may send a new request. This is the consequence of the meta-information being encrypted for the specific connection. Accordingly, the middlebox can react to the detection of the wrongly inserted meta-information (e.g. by dropping the packet, notifying the receiver and/or sender and/or administrator device, etc.).

The present invention shall now be described in conjunction with specific embodiments by making reference to the drawings. It is however noted that these specific embodiments as well as the illustrative figures serve to provide the skilled person with a better understanding of the invention but are not intended to restrict in any way the scope of the invention which is defined by the independent claims.

A system according to a first embodiment of the present invention will now be described with reference to FIG. 1. The system according to the first embodiment comprises a sender entity (120), a receiver entity (110), and a network entity (130). For example, the receiver entity may be a client terminal or a server. It may be the entity that receives some payload for which it requires a specific treatment along the network path. Typical examples of a receiver entity being a client are: MBB (Mobile Broadband) subscribers downloading files, browsing the Web, watching YouTube videos, etc. Typical examples of a receiver entity being a server are: a server requesting a service from another service for its internal processing, or a server requesting a server for generating another service to be provided to another server or user, etc. The sender entity may be a server providing services to terminals or to other servers. It may be the entity that sends the traffic, e.g., a YouTube server. The network entity (also referred herein in some examples as middlebox) is interposed between the sender entity and the receiver entity, namely the entity along the network path that may perform other tasks than just layer-3 packet routing. It may inspect the packets for the meta-information that is inserted in the packet header by the sender entity and perform the actions needed for the specific network domain treatment that is needed. Examples of network entities or middleboxes are: Policy Decision Points, DPI/SPI boxes, edge routers, etc.

The receiver entity (110) is configured to send a connection request to the sender entity (120). For example, the receiver entity may request specific data to be sent by the sender entity. The receiver entity (110) is configured to further send to the sender entity (120) at least one encrypted meta-information for said connection (noting that the request and the encrypted meta-information could be send together or separately, physically and/or logically, and any combination thereof). In one example, said meta-information may be a marker which indicates a specific treatment of the requested data along the network path. Such meta-information is decryptable by the network entity and the sender entity is capable of handling the meta-information only in encrypted form. In other words, the sender is normally (i.e. for a non-malicious server) not capable of decrypting the meta-information. The connection represents a physical or logical communication link connecting two physical or logical points in the network. An example of a connection is a TCP/IP or a UDP connection. However, the connection of the invention is not limited thereto, and may also refer to a flow within a known connection; for instance, in case a link between nodes comprises multiplexed flows, the connection here referred to may be one or more of those multiplexed flows. Furthermore, a connection and its properties (or parameters) as herein used may also refer to a session and its corresponding properties (or parameters), as in fact a session also characterizes the communication between two entities like the sender entity and receiver entity herein discussed. Thus, the encryption for the connection also comprises an encryption for the session in that the encryption is based on parameters of the session. Non-limiting examples of sessions are: HTTP (Hypertext Transfer Protocol) sessions, SIP (Session Initiation Protocol) sessions, telnet sessions. Moreover, meta-information refers to information that enables the network entity to apply a specific treatment to the packet. The meta-information being encrypted for the connection refers to the fact that the meta-information has been encrypted for that specific connection, e.g. it is encrypted such that it is a connection-unique encryption or such that it is not easily repeatable; in other words, it can be an absolute-unique encryption or an encryption which is unique for a given set of parameters (e.g. unique for a given time window, for a given set of receiver addresses, etc). In case the connection comprises multiplexed flows, the connection specific encryption may be represented by a flow specific encryption (e.g. some parameters of the flow will render the encryption a connection-specific encryption).

Figure 6:
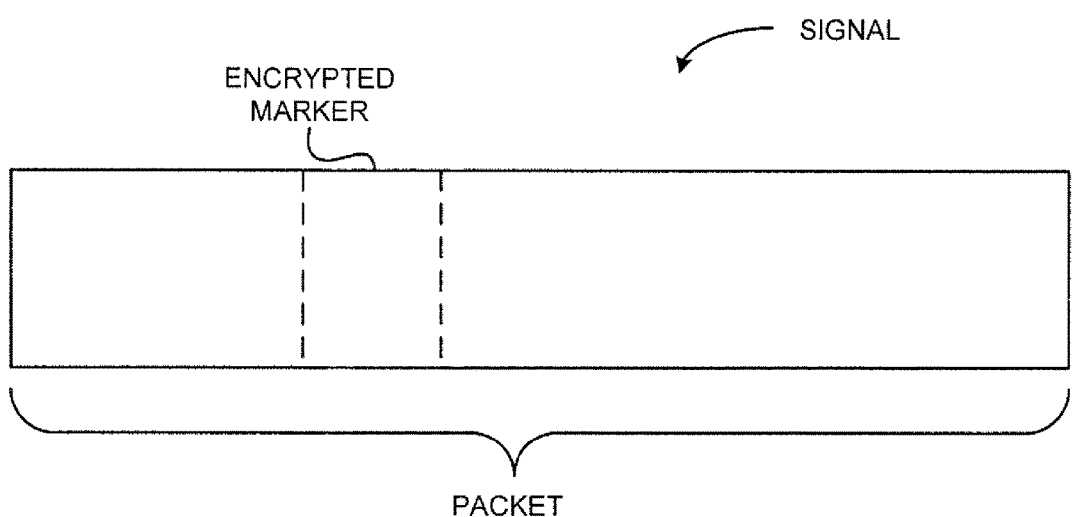
FIG. 6 illustrates a signal according to a seventh embodiment of the present invention.
Figure 7:
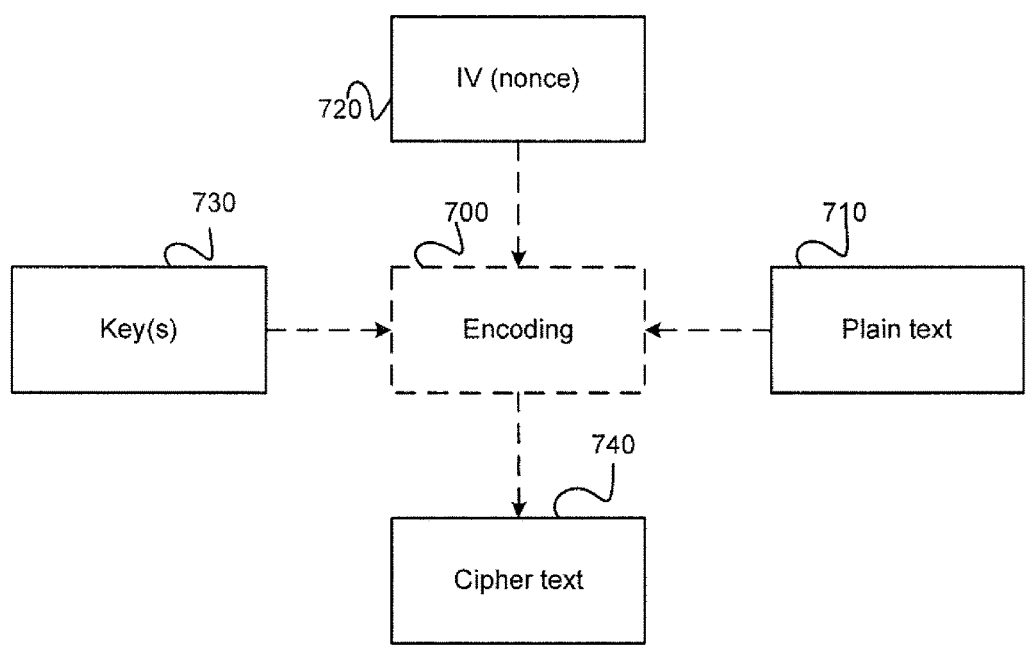
FIG. 7 illustrates an example of a typical message encoding in the server using a nonce.
Figure 8:
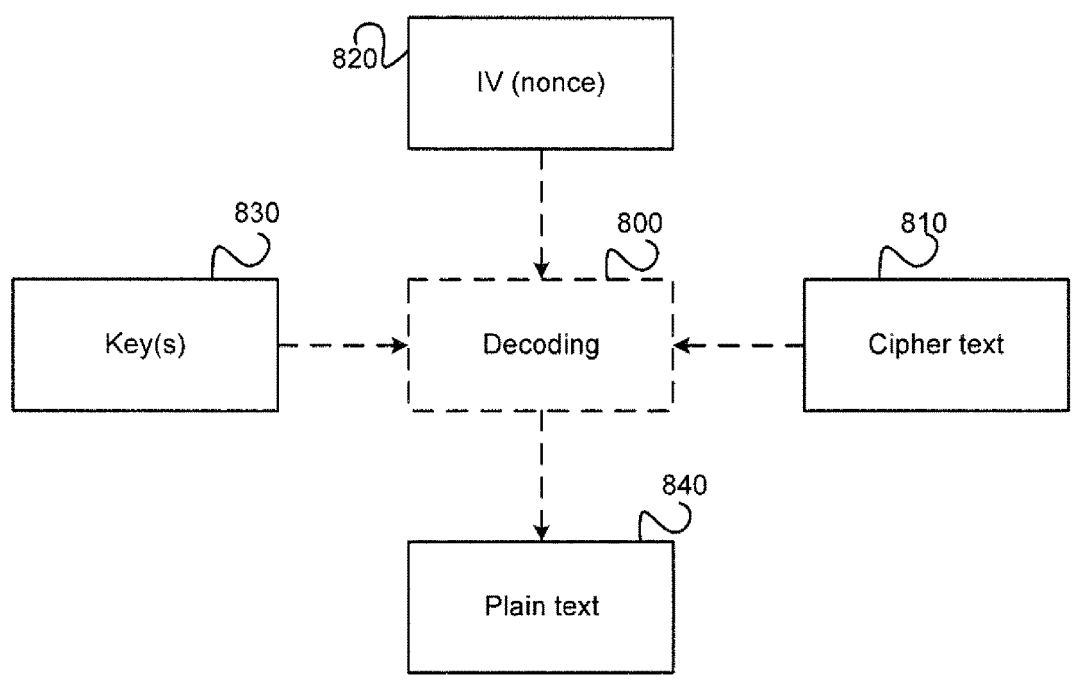
FIG. 8 illustrates an example of a message decoding in the receiver.
Figure 9:
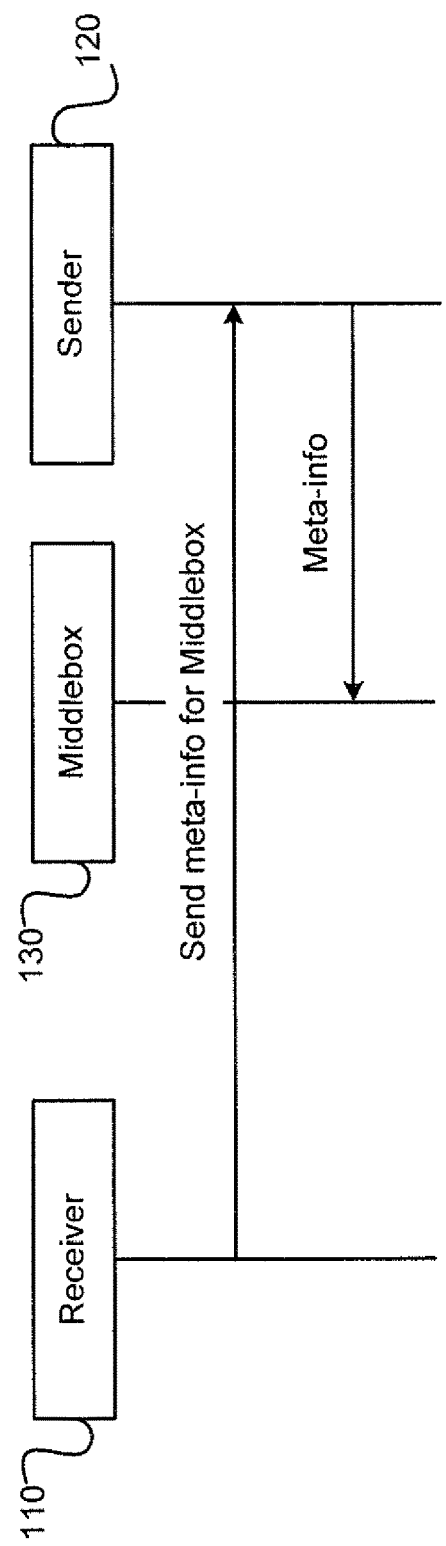
FIG. 9 illustrates an example of a reference scenario.

The sender entity (120) is configured to insert the at least one encrypted meta-information into at least one packet of said connection. An example of packet according to the present invention is shown in FIG. 6, which illustrates a signal for carrying a packet of a connection established between the sender entity and the receiver entity. The packet may contain a header, which may include an encrypted part (encrypted header) and/or an un-encrypted part (un-encrypted header), and a payload, namely the data requested by the receiver. The payload may be encrypted and may be decryptable by the receiver entity only, or by both the receiver and the network entity.

The meta-information (in FIG. 6 exemplified by a marker) might be inserted in the header (either in the encrypted header or in the un-encrypted header), it may be attached at the head or at the tail of the packet, or it may be inserted in any position of the header or payload, or interposed between header and payload. What is relevant is that the encrypted meta-information (exemplified in FIG. 6 by the encrypted marker) is inserted into the packet, regardless of how this is achieved.

The network entity (130) is configured to decrypt the at least one meta-information and to process the at least one packet on the basis of the decrypted at least one meta-information. To process the packet refers to apply, to the at least one packet on the basis of the decrypted at least one meta-information, a packet forwarding treatment when processing the forwarding or relaying of the packet on the network. The packet forwarding treatment includes policing, shaping, possible remarking (i.e. changing the marker with another one, or changing its value), queuing treatment, or scheduling treatment. The treatment includes also discarding the same packet, when in the forwarding processing this is determined in view of the meta-information and possibly other conditions like network congestion, node congestion, or choosing one path instead of others on the basis of the meta-information (e.g. a path characterized by one of a given latency, throughput, reliability). In other words, the treatment includes any packet treatment as known in the art, see e.g. the FCSs also referred to above as illustrative examples.

As a result, even in case a malfunctioning at the sender would cause the encrypted meta-information to be associated to the wrong packet, the middlebox can detect such situation (since the metadata encryption would not be for the connection to which it is associated) and react as appropriate.

For illustrative purposes, two exemplary cases are noted. An important case is when the data from sender entity to receiver entity is end-to-end encrypted (as in the example diagrams shown in FIGS. 10 and 11, which will be discussed in the following). In that case, as shown in FIG. 11, the encrypted meta-data may be sent to the network entity as part of the un-encrypted packet header or as part of the encrypted packet header (some of the packet header information may also be encrypted for security reason). The former case does not pose severe issues. However, in the latter case, care should be taken not to encrypt the meta-information (in the figure, exemplified by TCID Traffic Characteristics Identifier) by using the end-to-end credentials, because in that case the information becomes unavailable for the network entity. The simplest way to achieve this is to perform the end-to-end encryption first by the sender entity by omitting the field carrying the TCID value and then inserting the field with the TCID encrypted with the receiver entity-network entity credentials from the receiver entity. The network entity may thus decrypt the TCID (only) and the receiver entity removed the field with TCID before decrypting the remaining part with the end-to-end credentials. With this regard, the TCID represents an example of the meta-information, more specifically the TCID value may correspond to a priority to be given to the packet, a latency level required by the packet, etc. By the way, one could also name the TCID as MIID (Meta-Information ID).

According to an optional implementation of the first embodiment, the encryption is based on parameters characterizing said connection. Such parameters may be, for example, a unique connection or session specific information from the packet headers, five-tuple of the connection, i.e., source and destination IP addresses, source and destination ports and used transport protocol, any other property of the connection that is non-repetitive, or any combinations of the above, as also explained later. The parameters characterising the connection may be parameters characterizing a flow (e.g. a multiplexed flow) comprised in said connection.

According to a further optional implementation of the first embodiment, the receiver entity (110) is configured to encrypt said at least one meta-information on the basis of an initialization value and a key. As also explained above, the initialization value, or initialization vector, is a nonce, namely a number used once, and may change for every request. It is used together with the key in order to encrypt and decrypt the meta-information. It is calculated using a rule. The rule for calculating the initialization value and the key are known at both receiver and network entity (but not at the sender, which can handle the marker only in its encrypted state). The rule (and/or the key(s)) may be exchanged before the connection setup, or periodically; however, it is also possible that the rule is configured once, e.g. by an administrator. Exchanging the rule may prolong the connection setup time somewhat but may be favourable if connection information to be used for the initialization value generation would be hard to infer otherwise.

As noted above, there may be multiple meta-information to be revealed for the same connection. In that case, as many initialization vectors are needed as many different parameters to be encrypted, it may be advantageous to prevent repetition of sequences in the encrypted traffic. One solution for this scenario is that the receiver increases an additional sequence number for each new meta-information value, which is added besides the encrypted meta-information and both are sent as "new" meta-info to the network entity through the sender entity. Thus the network entity could use this sequence number together with the generated initialization value by the pre-negotiated rule to have a different initialization value for each different meta-information parameter.

According to a further optional implementation of the first embodiment, the network entity (130) is configured to decrypt the meta-information on the basis of an initialization value and a key. Such initialization vector is generated by the network entity using the rule known also by the receiver entity. As said above, such rule may be exchanged before connection setup or periodically, or may be fixed by the administrator.

According to a further optional implementation of the first embodiment, the initialization value is determined on the basis of the parameters characterizing said connection (and/or a flow multiplexed in the connection).

More specifically, the initialization value may be determined on the basis of parameters which characterize the connection by utilizing a generation rule. Such generation rule may be a mathematical function or an algorithm.

According to a further optional implementation of the first embodiment, the key is determined on the basis of the parameters characterizing said connection.

According to a further optional implementation of the first embodiment, the parameters characterizing said connection comprise one or a combination of connection identifiers, fields comprised in a header, or a non-repetitive property of the connection. The simplest case may be to use a unique connection or session specific information from the packet headers. For example, in the case of QUIC communication, the connection identifier (CID) may be the one to use as initialization value for encrypting a connection-specific meta-information. In another example, five-tuple of the connection, i.e., source and destination IP addresses, source and destination ports and used transport protocol may be used. Further, any other property of the connection that is non-repetitive. Moreover, any combinations of the above may be used.

Figure 2:
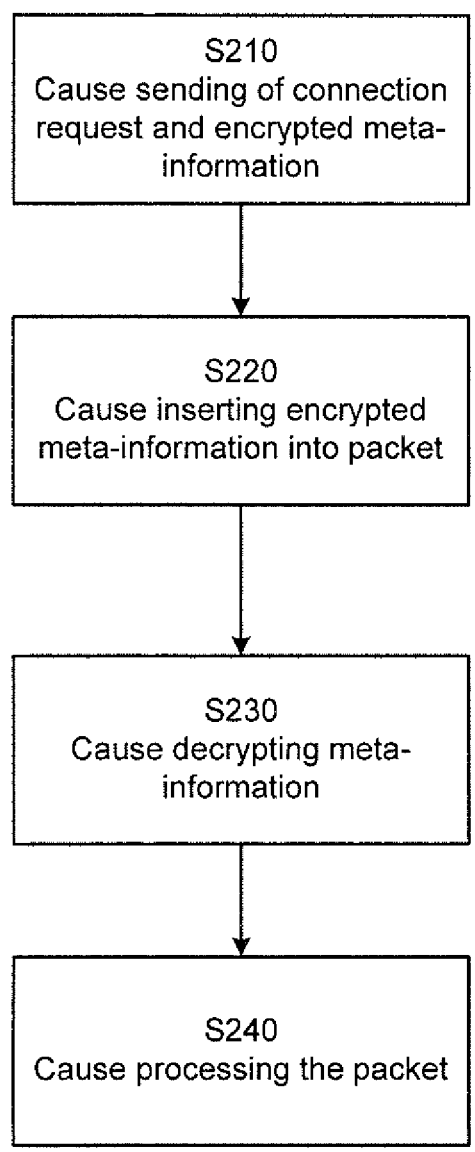
FIG. 2 illustrates a flow chart of a method according to a second embodiment of the present invention.

Next, a method according to a second embodiment of the present invention will be described with reference to FIG. 2. The considerations made above also apply to the present embodiment, and are therefore omitted. The method according to the second embodiment is for managing communications in a system (100) comprising a sender entity (120), a receiver entity (110), and a network entity (130). The method comprises a step of causing sending (S210), from the receiver entity (110) to the sender entity (120), of a connection request and of at least one encrypted meta-information for said connection.

Here, the action of causing refers to a unit or software element within the receiver entity that causes the sending (e.g. a processor or software module instructing the sending); it may also or alternatively refer to an external element or device causing (e.g. in the sense of triggering) the sending by the receiver entity (e.g. a management device, a data center, a tenant, an administrator, instructing or initiating the sending).

The method further comprises the step of causing, at the sender entity (120), inserting (S220) the at least one encrypted meta-information into at least one packet of said connection.

The method further comprises the step of causing, at the network entity (130), decrypting (S230) the at least one meta-information and causing processing (S240) of the at least one packet on the basis of the decrypted at least one meta-information.

According to an optional implementation of the second embodiment, the encryption is based on parameters characterizing said connection.

According to a further optional implementation of the second embodiment, the at least one encrypted meta-information is obtained by performing encryption of said at least one meta-information on the basis of an initialization value and a key.

According to a further optional implementation of the second embodiment, the method further comprises the step of causing, at the network entity (130), the decryption of the meta-information on the basis of an initialization value and a key.

According to a further optional implementation of the second embodiment, the initialization value is determined on the basis of the parameters characterizing said connection.

According to a further optional implementation of the second embodiment, the key is determined on the basis of the parameters characterizing said connection.

According to a further optional implementation of the second embodiment, the parameters characterizing said connection comprise one or a combination of connection identifiers, fields comprised in a header, or a non-repetitive property of the connection.

Further, an example of the second embodiment will be described with reference to FIGS. 10 and 11. The proposed method is shown in FIG. 11 and is compared with a state-of-art solution shown in FIG. 10.

Figure 10:
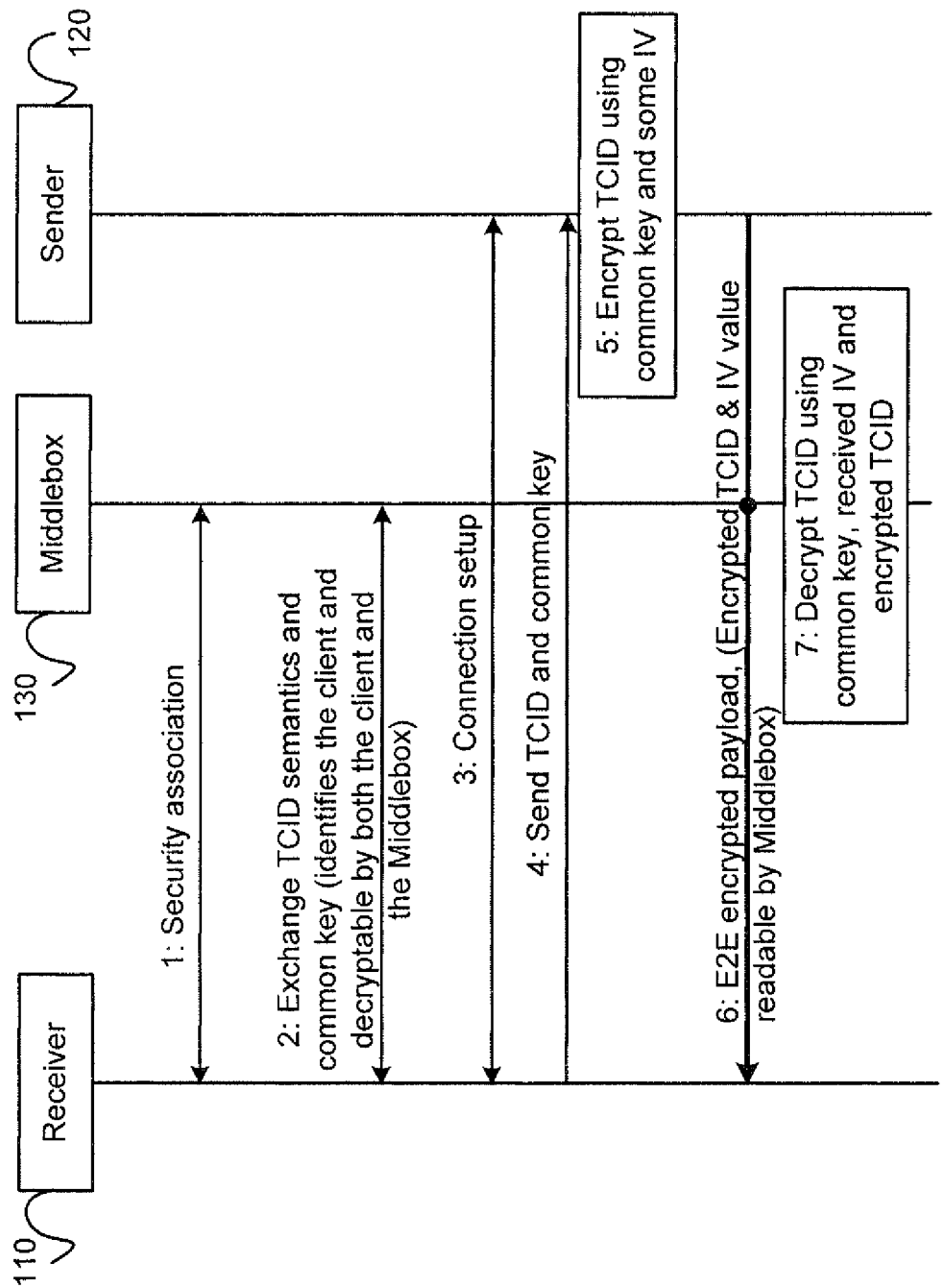
FIG. 10 illustrates an example sequence diagram illustrating traffic meta-information reveal from the sender when the receiver has an agreement with the operator/ISP (Internet Service Provider) and the sender is trusted.
Figure 11:
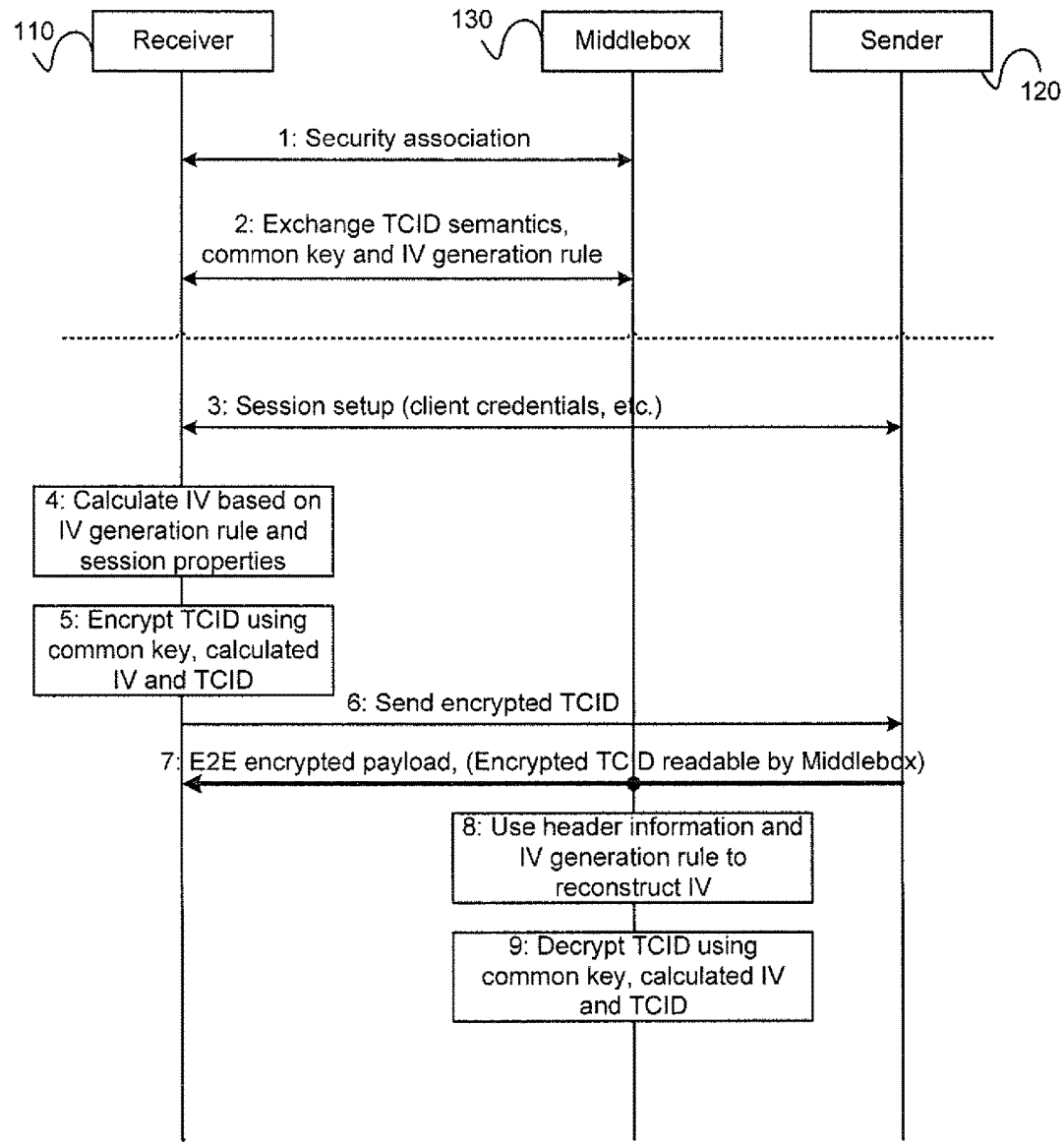
FIG. 11 illustrates an example sequence diagram illustrating the proposed solution for encryption of TCID (Traffic Characteristics Identifier) for an untrusted sender.
Figure 12:
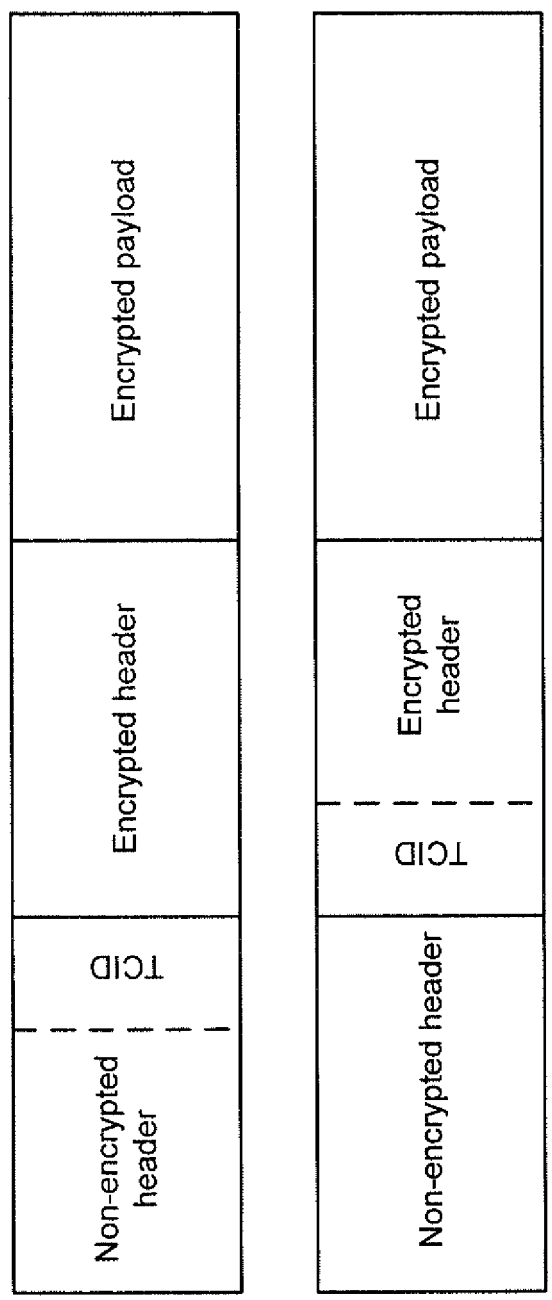
FIG. 12 illustrates examples of variants for sending the encrypted meta-data (TCID) in case of end-to-end encryption: as part of the non-encrypted header (upper figure) or part of the encrypted header (lower figure).

At step 1 in FIGS. 10 and 11, a receiver wants to send encrypted meta-information to the network in order that no un-authorized 3rd party can infer the meta-information. For this reason a security association is established with the middlebox to exchange the security credentials as needed (FIG. 10 does not show the exchange of security credentials, but this information may be included also in the exchange of information depicted in FIG. 10).

At step 2 of FIGS. 10 and 11, the security association is used to exchange the semantics of the meta-information (i.e., what encodings-denoted by TCID- to use for a certain treatment, as well as the common key to encrypt it. In the non-trusted case (FIG. 11), also the rules for generating the IV for the connection-specific TCID encryption are exchanged.

At step 3 of FIGS. 10 and 11, the connection is established between the sender and receiver. Data on this connection is going to undergo a specific treatment by the network. It is noted that FIG. 11 shows a session setup, which represents an example of a connection setup (as in fact, within the present discussion and as above explained, a session characterizes the communication between two points in the same way as a connection characterizes a communication between two points). It is also noted that a connection setup or a session setup message may comprise additional information to those herein described or those depicted in the figures.

In the trusted case (FIG. 10), in step 4, the desired TCID to be used for packet markings for the connection is sent to the sender together with the common key. The Server encrypts the TCID using the common key and some Initialisation Vector (IV) that is e.g., inserted in the packet structure (Step 5). The middlebox can thus decrypt TCID by using the common key, received IV and encrypted TCID. In step 6 of FIG. 10, the sender may encrypt the packet (e.g. the TCID and the payload) and transmit it to the sender. The packet is forwarded by network entities through the network until it reaches the sender; the middlebox is an example of the network entity forwarding the packet and applying a treatment on the packet on the basis of the meta-information. In step 7 of FIG. 10, the middlebox decrypts the packet, in particular it decrypts the TCID in order to apply the treatment corresponding to the TCID (decrypted) value so that the packet can be forwarded according to the intended treatment.

In the untrusted case (FIG. 11), encryption of TCID by the sender is not possible. Instead, it is done by the receiver, in two steps: first, it calculates the connection-specific IV based on IV generation rule (received in step 2) and session properties (step 4); then it encrypts TCID using the common key, calculated IV and plain TCID (step 5).

The receiver then sends the encrypted TCID to the sender (step 6). The sender inserts the encrypted TCID value into the packets that are sent to the receiver (step 7) (or attaches the encrypted TCID value to the packets) in a way that the encrypted TCID is readable by middlebox. The middlebox then uses the header information and IV generation rule to reconstruct the connection-specific IV (step 8) and then it decrypts TCID by using the common key, calculated IV and TCID. The network entity may then treat the packet according to the TCID, as also above described.

Figure 3:
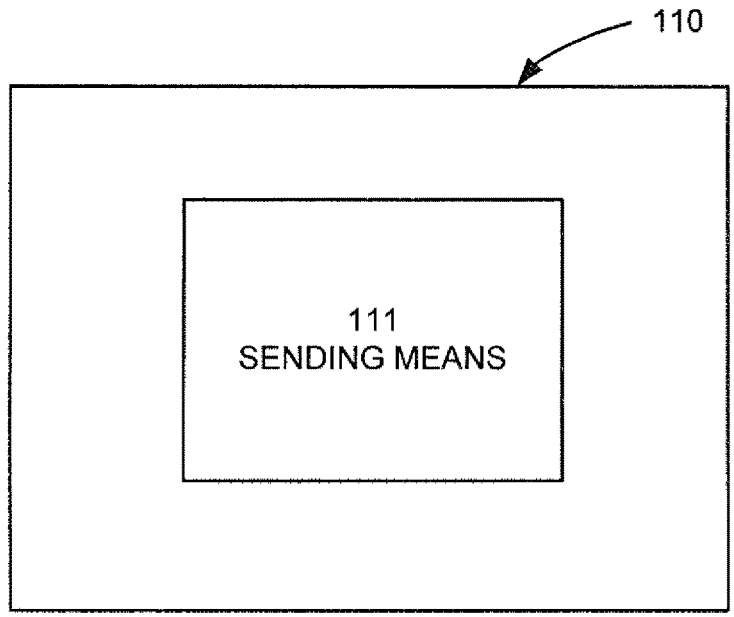
FIG. 3 illustrates a receiver entity according to a third embodiment of the present invention.

Further, a receiver entity according to a third embodiment of the present invention will be described with reference to FIG. 3. The receiver entity according to the third embodiment is a receiver entity in a system (100) comprising a sender entity (120), said receiver entity (110), and a network entity (130) and comprises sending means (111) configured to send a connection request to the sender entity (120), and to further send to the sender entity (120) at least one encrypted meta-information for said connection. The meta-information is decryptable by the network entity (130) and the sender entity (120) is capable of handling the meta-information only in encrypted form. Namely, the sender does not have the means for decrypting, or the sender is not capable of decrypting.

Figure 4:
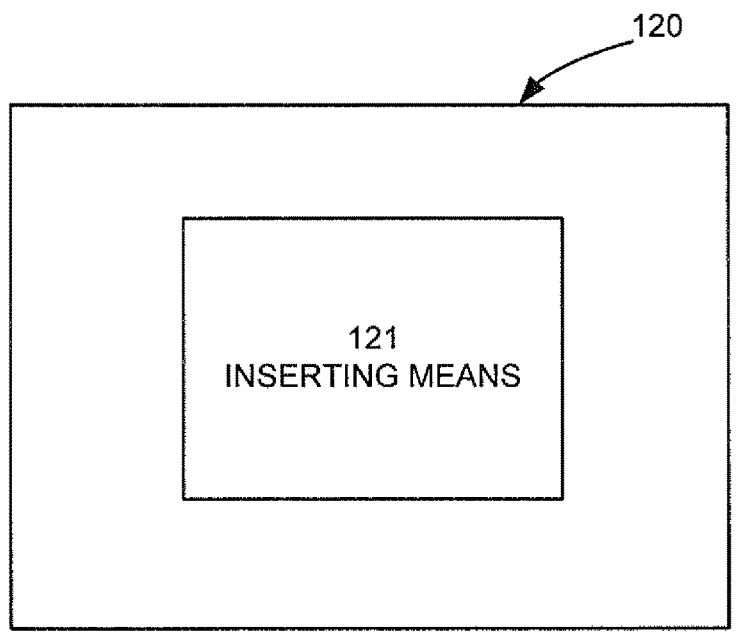
FIG. 4 illustrates a sender entity according to a fourth embodiment of the present invention.

Further, a sender entity according to a fourth embodiment of the present invention will be described with reference to FIG. 4. The sender entity according to the fourth embodiment is a sender entity (120) in a system (100) comprising said sender entity (120), a receiver entity (110), and a network entity (130), and comprises inserting means (121) configured to insert at least one encrypted meta-information received from the receiver entity (110) into at least one packet of said connection. The sender entity (120) is capable of handling the meta-information only in encrypted form.

Figure 5:
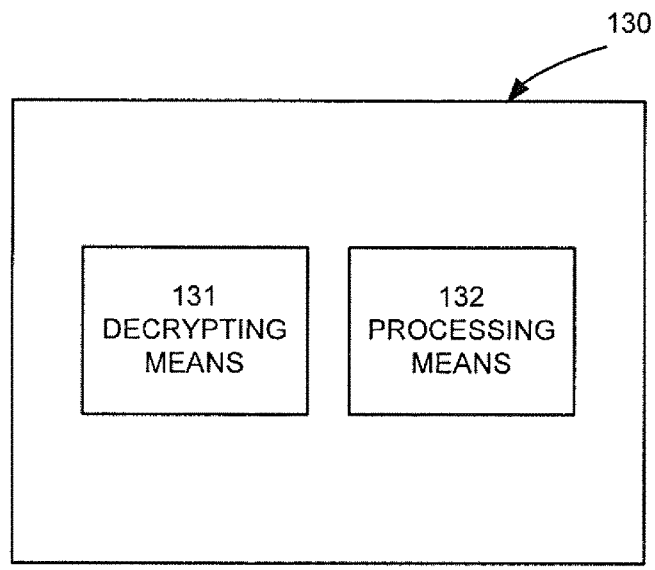
FIG. 5 illustrates a network entity according to a fifth embodiment of the present invention.

Further, a network entity according to a fifth embodiment of the present invention will be described with reference to FIG. 5. The network entity according to the fifth embodiment is a network entity (130) in a system (100) comprising a sender entity (120), a receiver entity (110), and said network entity (130), and comprises decrypting means (131) configured to decrypt at least one meta-information included in a packet of a connection established between the sender entity (120) and the receiver entity (110); and processing means (132) configured to process the at least one packet on the basis of the decrypted at least one meta-information.

According to an optional implementation of the fifth embodiment, the encrypted meta-information is obtained by encrypting the meta-information according to a rule known to the network entity and the receiver. Moreover, the sender entity is capable of handling the meta-information only in encrypted form. The meta-information is used at a network entity for processing the packet when deciding on forwarding it on the network, namely it is used in order to apply a specific network treatment to the packet when the packet is forwarded from the network entity to the receiver entity.

Figure 13:
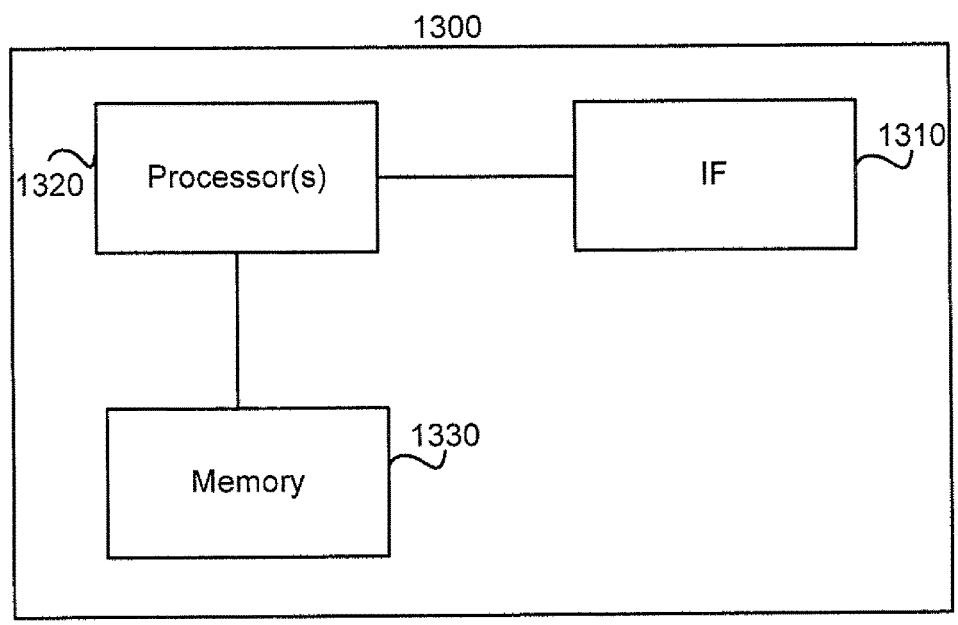
FIG. 13 illustrates an example of a computer suitable for executing a program according to the invention.

Further, a program according to a sixth embodiment of the present invention will be described. The program according to the sixth embodiment is for managing communications in a system (100) comprising a sender entity (120), a receiver entity (110), and a network entity (130). The program is configured to execute, when said program is executed on a computer, all the steps according to the second embodiment and optionally its optional implementations. A computer suitable for executing such program is illustrated in FIG. 13. Such a computer typically comprises a processor 1320 (for executing instructions), a memory 1330 (for storing instructions and/or results of the instructions and/or data for input/output), and an interface IF 1310 (e.g. for input/output).

Further, a signal according to a seventh embodiment will now be described. The signal according to the seventh embodiment is suitable for carrying a packet of a connection established between a sender entity (110) and a receiver entity (120). The packet includes an encrypted meta-information encrypted by the receiver entity (110) and decryptable by a network entity (120). Namely, the meta-information is not decryptable by the sender and the sender can only see the meta-information in the encrypted form. The network entity configured to process the packet on the basis of the meta-information.

According to an optional implementation of the seventh embodiment, the encrypted meta-information is inserted at the sender entity (120) and the sender entity (120) is capable of handling the meta-information only in encrypted form.

As described above, the present invention provides a system and a method for secure in-band meta-information communication with a network entity when the traffic sender is not included in the security association (service agreement), using a common key between the traffic receiver (determining the QoS handling(s) to use for a certain connection) and the network entity the information is revealed to, and a connection-specific unique identifier used as initialization value (nonce). The meta-information may be encrypted by the receiver entity (traffic receiver) using a pre-agreed connection specific (e.g. unique, see above as to unique) identifier and sent to the sender entity (traffic sender). The pre-agreed connection-specific unique identifier may be a function of one or more of the following: a connection identifier used in the transport connection; a five-tuple of the connection, i.e., source and destination IP addresses, source and destination ports and used transport protocol; entropy bits generated for this purpose if needed; parameters of a multiplexed flow within the connection.

The above-described invention refers to, but it is not limited to, a scenario when meta-information should be revealed to the middlebox by the receiver of the traffic but the receiver transfers this information through the Sender. It allows a connection-unique encryption and authentication for the meta-information by the receiver, where the connection is a Transmission Control Protocol/Internet Protocol (TCP/IP) connection defined by a unique five-tuple (source-destination IP address, source-destination port numbers, protocol in use).

It provides a connection-specific (e.g. unique, see above for unique: it can be absolutely unique, or unique for a certain time range, for a certain address range, etc.) way to determine one or more initialization values used for the above-mentioned encryption and authentication that is pre-configurable between the network entity, for example a middlebox, and the receiver entity, but the pre-configuration does not refer to a specific number or set of numbers (which could represent a security threat used multiple times for the encryption), but rather the method to generate the initialization value based on information from the identifiers of the given connection. In other words, the meta-information is encrypted for or on the basis of connection specific parameters, rather than on values independent from the connection. By having the connection-specific (e.g. unique) initialization value the above advantages are achieved.

Further, the present invention provides a simple means to encrypt meta-information to be sent to a network entity interposed between a sender and a receiver, for example a middlebox, in such a way there is no possibility for the sender entity to wrongly use meta-information (e.g. re-use the same meta-information in another connection). The invention allows the usage of generic scope meta-information by the network domains (e.g., the same TCID describing a certain desired network treatment for all potential Receivers). This simplifies the network management in the network domain.

Moreover, the invention also offers privacy of meta-information communication, i.e., the sender is not aware of what service (TCID) is requested for a given flow to a given Receiver.

An entity as above described may be implemented in hardware and/or software, and may be further implemented in a localized manner (e.g. on a single apparatus) or distributed manner (e.g. on multiple interconnected devices).

It will be apparent to those skilled in the art that various modifications and variations can be made in the entities, methods, systems, computer programs and signals of the invention as well as in the construction of this invention without departing from the scope and/or spirit of the invention.

The invention has been described in relation to particular embodiments and examples which are intended in all aspects to be illustrative rather than restrictive. Those skilled in the art will appreciate that many different combinations of hardware, software and firmware will be suitable for practicing the present invention.

Moreover, the above receiver entity, sender entity, and network entity, can be equivalently exchanged by receiver, sender, and network unit.

Where the terms like sender (sender entity), receiver (receiver entity) and network unit (network entity) are used herewith, no restriction is made regarding how distributed these units may be and regarding how gathered elements may be. That is, the constituent parts of a unit or element or entity may be distributed in different software or hardware components or devices for bringing about the intended function. A plurality of distinct elements may also be gathered for providing the intended functionalities.

Any one of the above-referred units of an entity, or an element, or a network device, or a network node, etc. may be implemented in hardware, software, field-programmable gate array (FPGA), application-specific integrated circuit (ASICs), firmware or the like.

The invention claimed is:

1. A system, comprising:
   a sender entity;
   a receiver entity;
   a network entity interposed between the sender entity and the receiver entity;
   wherein the receiver entity is configured to:
   send a connection request to the sender entity; and
   send, to the sender entity, at least one encrypted meta-information for the connection;
   wherein the sender entity is configured to insert the at least one encrypted meta-information into at least one packet of the connection, wherein the meta-information is a marker which indicates a specific treatment of data along a network path;
   wherein the network entity is configured to:
   decrypt the at least one meta-information; and
   process the at least one packet based on the decrypted at least one meta-information.

2. The system of claim 1, wherein the encryption is based on parameters characterizing the connection.

3. The system of claim 1, wherein the receiver entity is configured to encrypt the at least one meta-information based on an initialization value and a key.

4. The system of claim 3, wherein the initialization value is determined based on parameters characterizing the connection.

5. The system of claim 3, wherein the key is determined based on parameters characterizing the connection.

6. The system of claim 1, wherein the network entity is configured to decrypt the meta-information based on an initialization value and a key.

7. The system of claim 2, wherein the parameters characterizing the connection comprise at least one of: connection identifiers, fields comprised in a header, a non-repetitive property of the connection.

8. A method for managing communications in a system, the system comprising a sender entity, a receiver entity, and a network entity interposed between the sender entity and the receiver entity, the method comprising:
   causing the receiver entity to send, to the sender entity, a connection request and at least one encrypted meta-information for the connection;
   causing the sender entity to insert the at least one encrypted meta-information into at least one packet of the connection, wherein the meta-information is a marker which indicates a specific treatment of data along a network path;
   causing the network entity to:
   decrypt the at least one meta-information; and
   process the at least one packet based on the decrypted at least one meta-information.

9. The method of claim 8, wherein the encryption is based on parameters characterizing the connection.

10. The method of claim 8, wherein the at least one encrypted meta-information is obtained by performing encryption of the at least one meta-information based on an initialization value and a key.

11. The method of claim 10, wherein the initialization value is determined based on the parameters characterizing the connection.

12. The method of claim 10, wherein the key is determined based on the parameters characterizing the connection.

13. The method of claim 8, further comprising causing the network entity to decrypt the meta-information based on an initialization value and a key.

14. The method of claim 9, wherein the parameters characterizing the connection comprise at least one of: connection identifiers, fields comprised in a header, a non-repetitive property of the connection.

15. A receiver entity in a system, the system comprising a sender entity, the receiver entity, and a network entity interposed between the sender entity and the receiver entity, the receiver entity comprising:
   processing circuitry;
   memory containing instructions executable by the processing circuitry whereby the receiver entity is operative to:

send a connection request to the sender entity;
send, to the sender entity, at least one encrypted meta-information for the connection, wherein the meta-information is a marker which indicates a specific treatment of requested data along a network path;
wherein the meta-information is decryptable by the network entity; and
wherein the sender entity is capable of handling the meta-information only in encrypted form.

16. A sender entity in a system, the system comprising the sender entity, a receiver entity, and a network entity interposed between the sender entity and the receiver entity, the sender entity comprising:
processing circuitry;
memory containing instructions executable by the processing circuitry whereby the sender entity is operative to:
insert at least one encrypted meta-information received from the receiver entity into at least one packet of a connection, wherein the meta-information is a marker which indicates a specific treatment of data along a network path;
wherein the sender entity is capable of handling the meta-information only in encrypted form.

17. A network entity in a system, the system comprising a sender entity, a receiver entity, and the network entity, the network entity interposed between the sender entity and the receiver entity; the network entity comprising:
processing circuitry;
memory containing instructions executable by the processing circuitry whereby the network entity is operative to:
decrypt at least one meta-information included in a packet of a connection established between the sender entity and the receiver entity, wherein the meta-information is a marker which indicates a specific treatment of data along a network path;
process the at least one packet based on the decrypted at least one meta-information.

18. The network entity of claim 17:
wherein the encrypted meta-information is obtained by encrypting the meta-information according to a rule known to the network entity and the receiver entity; and
wherein the sender entity is capable of handling the meta-information only in encrypted form.

19. A non-transitory computer readable recording medium storing a computer program product for managing communications in a system comprising a sender entity, a receiver entity, and a network entity interposed between the sender entity and the receiver entity, the computer program product comprising software instructions which, when run on processing circuitry of a computing device, causes the computing device to:
cause the receiver entity to send, to the sender entity, a connection request and at least one encrypted meta-information for the connection;
cause the sender entity to insert the at least one encrypted meta-information into at least one packet of the connection, wherein the meta-information is a marker which indicates a specific treatment of data along a network path;
cause the network entity to:
decrypt the at least one meta-information; and
process the at least one packet based on the decrypted at least one meta-information.

* * * * *